United States Patent
Chamberland

(12) 
(10) Patent No.: US 9,267,636 B2
(45) Date of Patent: Feb. 23, 2016

(54) PROTECTIVE LINER WITH WEAR DETECTION

(75) Inventor: Daniel André Chamberland, Lively (CA)

(73) Assignee: 1876255 ONTARIO LIMITED, Lively (CA)

( * ) Notice: Subject to any disclaimer, the term of this patent is extended or adjusted under 35 U.S.C. 154(b) by 437 days.

(21) Appl. No.: 13/696,606

(22) PCT Filed: May 6, 2011

(86) PCT No.: PCT/CA2011/050277
§ 371 (c)(1),
(2), (4) Date: Nov. 7, 2012

(87) PCT Pub. No.: WO2011/137539
PCT Pub. Date: Nov. 10, 2011

(65) Prior Publication Data
US 2013/0061971 A1    Mar. 14, 2013

Related U.S. Application Data

(60) Provisional application No. 61/332,235, filed on May 7, 2010.

(51) Int. Cl.
*F16L 55/00* (2006.01)
*F16L 57/06* (2006.01)
*F16L 9/12* (2006.01)

(52) U.S. Cl.
CPC .................. *F16L 57/06* (2013.01); *F16L 9/125* (2013.01); *F16L 2201/30* (2013.01)

(58) Field of Classification Search
CPC ........ F16L 9/125; F16L 57/06; F16L 2201/30
USPC ......................................................... 138/104
See application file for complete search history.

(56) References Cited

U.S. PATENT DOCUMENTS 3,727,126 A   4/1973  Kiselman et al.
4,446,892 A   5/1984  Maxwell
(Continued)

FOREIGN PATENT DOCUMENTS

AU    2003236074 B2    5/2008
CA      1331395 C       8/1994
(Continued)

OTHER PUBLICATIONS

International Search Report of Aug. 3, 2011 in respect of International Application No. PCT/CA2011/050277.
(Continued)

*Primary Examiner* — Daniel R Shearer
(74) *Attorney, Agent, or Firm* — Bereskin & Parr LLP/S.E.N.C.R.L., s.r.l.

(57) ABSTRACT

An apparatus for transporting materials including an electrically conductive substrate and a protective liner being in contact with the transported materials. The protective liner includes an electrically non-conductive first layer coupled to the substrate, and an electrically conductive second layer coupled to the first layer. The first layer electrically insulates the second layer from the substrate. A monitoring device is connected to the substrate and the second layer, and configured to detect an electrical connection between the substrate and the second layer indicative of wear of the protective liner. The apparatus can be in a form of a pipe, hose, elbow, valve or tank, and may be used to transport abrasive materials.

13 Claims, 5 Drawing Sheets

(56) References Cited

U.S. PATENT DOCUMENTS

| | | | |
|---|---|---|---|
| 4,878,180 A | 10/1989 | McWhirter et al. | |
| 4,881,409 A | 11/1989 | Roarty | |
| 5,007,291 A | 4/1991 | Walters et al. | |
| 5,172,730 A * | 12/1992 | Driver | G01M 3/18 138/103 |
| 5,177,468 A | 1/1993 | Baldwin et al. | |
| 5,228,478 A * | 7/1993 | Kleisle | F16L 57/06 116/208 |
| 5,378,991 A | 1/1995 | Anderson et al. | |
| 5,549,004 A | 8/1996 | Nugent | |
| 5,551,484 A * | 9/1996 | Charboneau | F16L 55/1656 138/104 |
| 5,634,497 A | 6/1997 | Neto | |
| 5,734,323 A | 3/1998 | Hermes et al. | |
| 6,370,945 B2 * | 4/2002 | Roberts | 324/694 |
| 6,386,237 B1 | 5/2002 | Chevalier et al. | |
| 6,498,991 B1 | 12/2002 | Phelan et al. | |
| 6,865,941 B2 * | 3/2005 | Gibbs | G01M 3/18 340/605 |
| 7,293,461 B1 | 11/2007 | Girndt | |
| 7,555,936 B2 | 7/2009 | Deckard | |
| 7,594,434 B2 | 9/2009 | Dagenais et al. | |
| 8,515,687 B2 * | 8/2013 | Pereira et al. | 702/34 |
| 2004/0065377 A1 | 4/2004 | Whiteley | |
| 2005/0069016 A1 | 3/2005 | Martin et al. | |
| 2007/0022830 A1 | 2/2007 | Mandziuk et al. | |
| 2008/0260324 A1 | 10/2008 | Takahashi et al. | |
| 2009/0107553 A1 * | 4/2009 | Hayes et al. | 137/1 |

FOREIGN PATENT DOCUMENTS

| | | |
|---|---|---|
| CA | 2364599 A1 | 10/2000 |
| CA | 2588986 A1 | 6/2006 |
| CA | 2704587 A1 | 7/2008 |
| CN | 201218790 Y | 4/2009 |
| DE | 19534503 A1 | 4/1997 |
| DE | 19620954 A1 | 11/1997 |
| DE | 102007008882 A1 | 8/2008 |
| EP | 1985998 A1 | 10/2008 |
| GB | 2403009 B | 12/2005 |
| JP | 56027647 A | 3/1981 |
| JP | 57026737 A | 2/1982 |
| JP | 58201066 A | 11/1983 |
| JP | 62182649 A | 8/1987 |
| JP | 62277542 A | 12/1987 |
| JP | 63159741 A | 7/1988 |
| JP | 01202612 A | 8/1989 |
| JP | 02231562 A | 9/1990 |
| JP | 03148006 A | 6/1991 |
| JP | 05034323 A | 2/1993 |
| JP | 05099806 A | 4/1993 |
| JP | 05107217 A | 4/1993 |
| JP | 05279874 A | 10/1993 |
| JP | 05288650 A | 11/1993 |
| JP | 11014782 A | 1/1999 |
| JP | 2000097688 A | 4/2000 |
| JP | 2000146725 A | 5/2000 |
| JP | 2001004352 A | 1/2001 |
| JP | 2001027628 A | 1/2001 |
| JP | 2001264260 A | 9/2001 |
| JP | 2002257792 A | 9/2002 |
| JP | 2002350407 A | 12/2002 |
| JP | 2005189227 A | 7/2005 |
| JP | 2005189229 A | 7/2005 |
| JP | 2005337830 A | 12/2005 |
| JP | 2006038588 A | 2/2006 |
| JP | 2006184028 A | 7/2006 |
| JP | 2007263668 A | 10/2007 |
| JP | 2008026162 A | 2/2008 |
| JP | 2008157806 A | 7/2008 |
| JP | 2009156820 A | 7/2009 |
| JP | 2009204370 A | 9/2009 |
| WO | 03076916 A1 | 9/2003 |
| WO | 2006011484 A1 | 2/2006 |
| WO | 2007113907 A1 | 10/2007 |
| WO | 2009114847 A1 | 9/2009 |

OTHER PUBLICATIONS

Written Opinion of Aug. 3, 2011 in respect of International Application No. PCT/CA2011/050277.
Chemlok 286 product information, Lord Corporation.
Chemlok 289/290 product information, Lord Corporation.
Interthane 990 product information, AkzoNobel.
Interzinc 315 product information, AkzoNobel.
Polycorp Rubber Mill Liners product information, Polycorp Ltd.
RS-0563 Material Specification Sheet, RubberSource Inc.

* cited by examiner

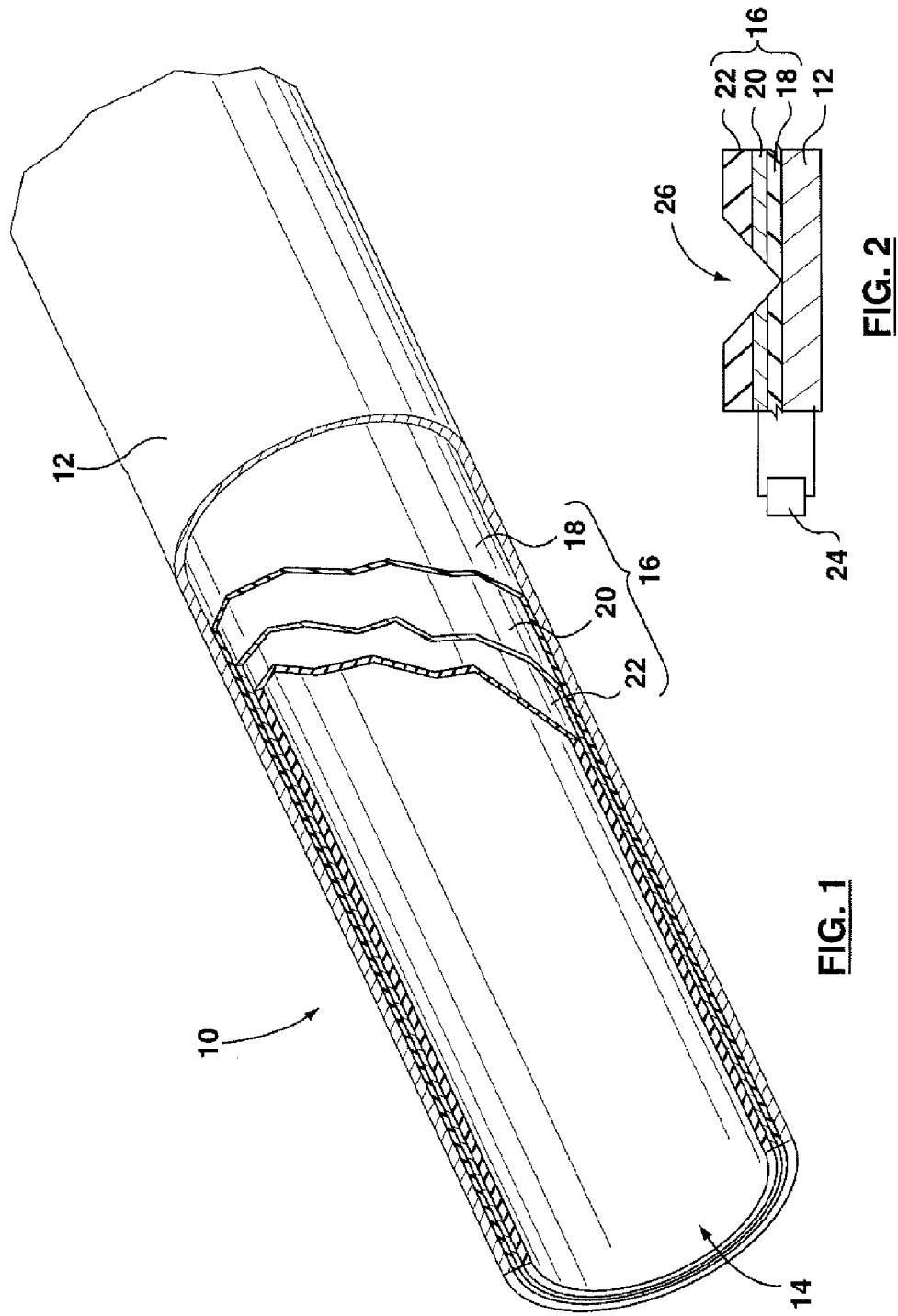

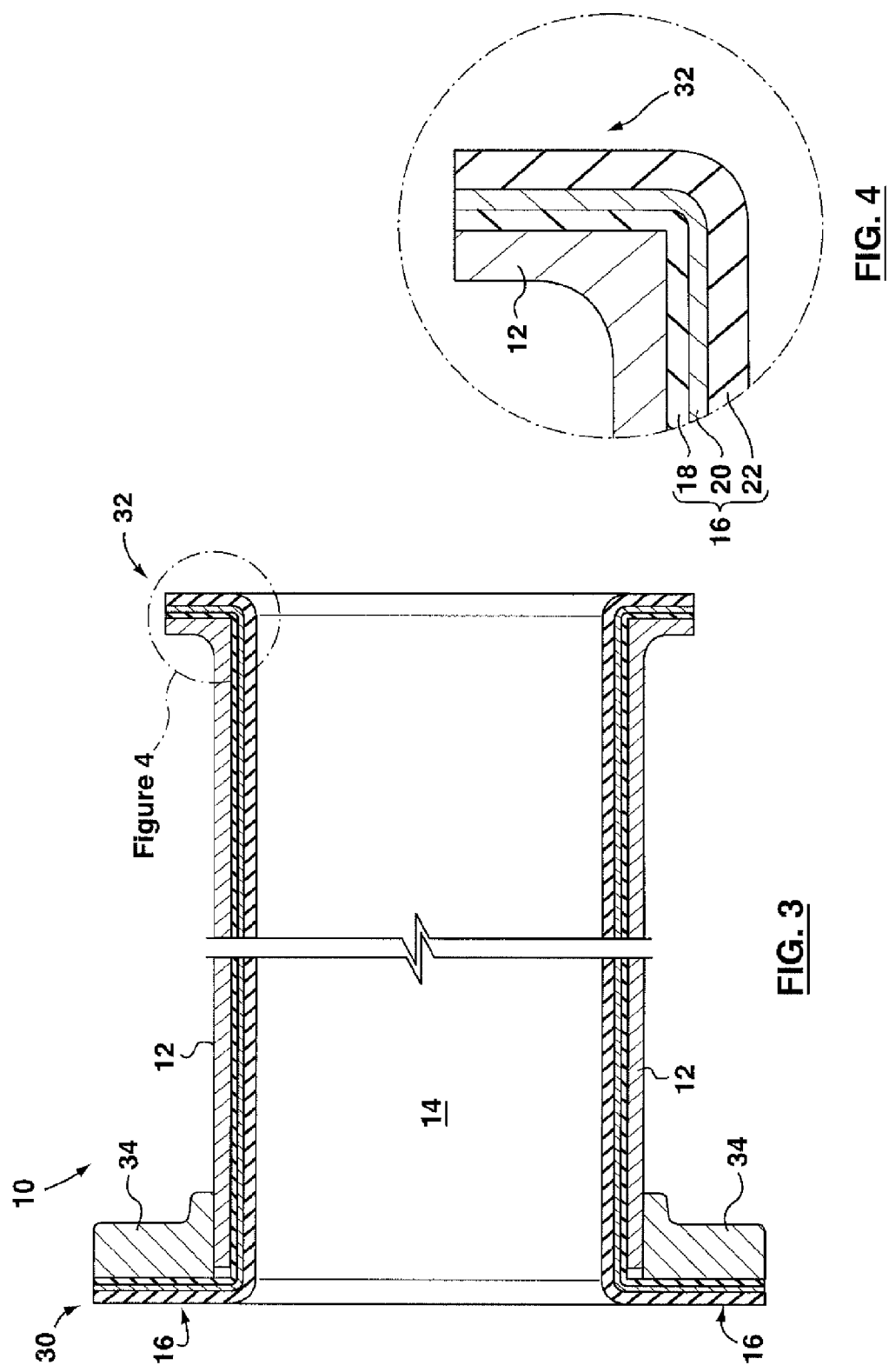

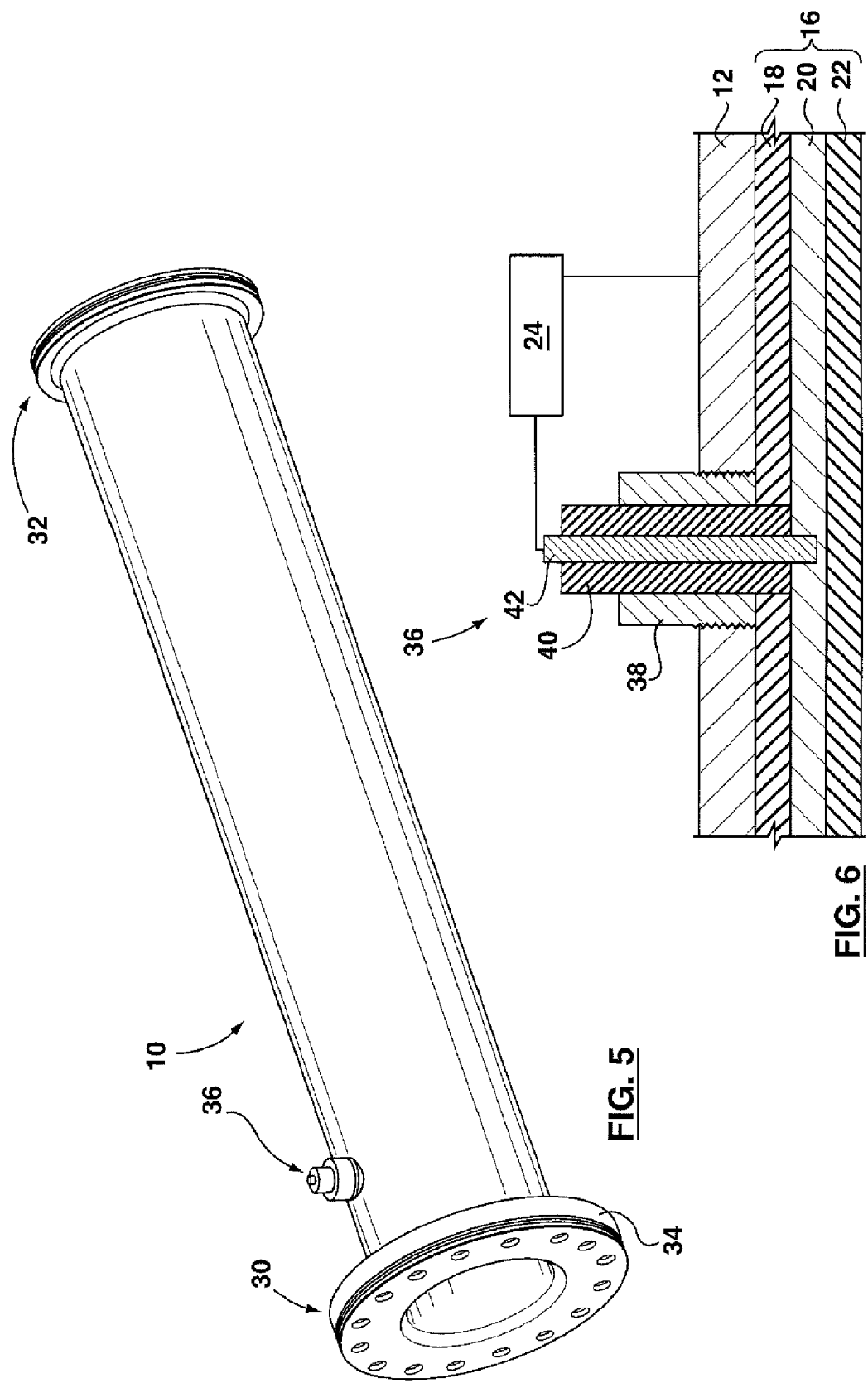

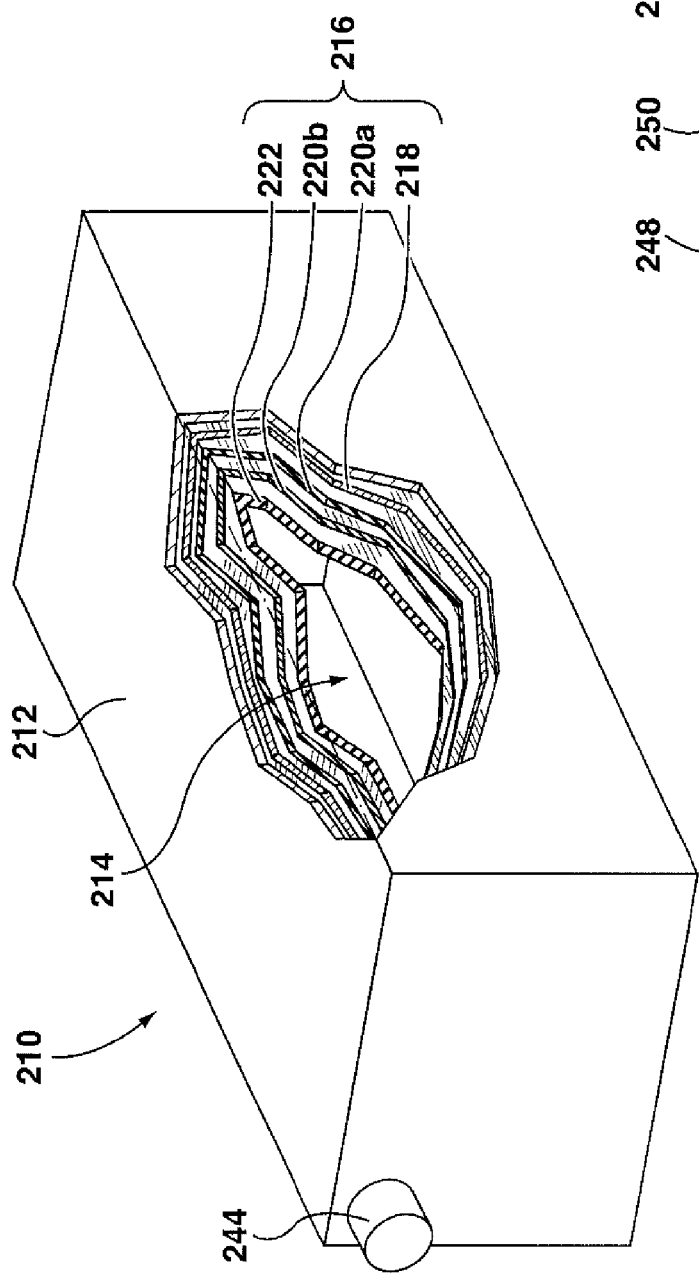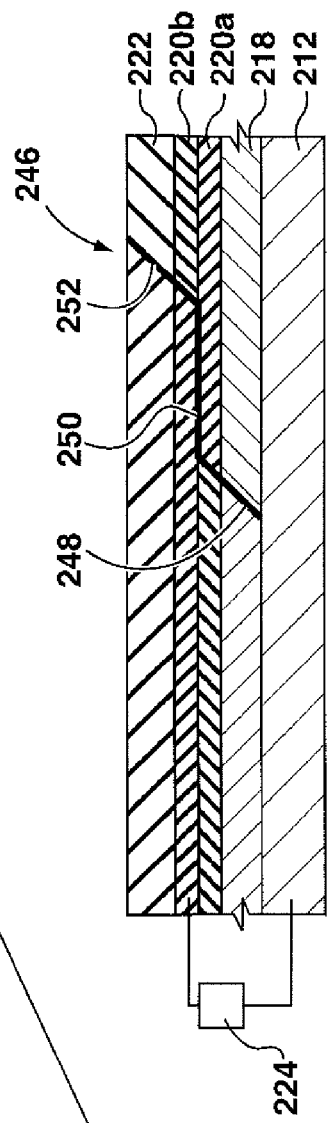

PROTECTIVE LINER WITH WEAR DETECTION

CROSS REFERENCE TO RELATED APPLICATION

This is a national stage application of International Application No. PCT/CA2011/050277 filed on May 6, 2011, which claims priority to U.S. Provisional Application No. 61/332,235 filed on May 7, 2010 and entitled PROTECTIVE LINER WITH WEAR DETECTION, and the entire contents of each are hereby incorporated herein by reference.

FIELD

This specification relates to protective liners for material transport apparatuses, for example, pipes or tanks.

BACKGROUND

The following paragraphs are not an admission that anything discussed in them is prior art or part of the knowledge of persons skilled in the art.

U.S. Pat. No. 5,177,468 (Baldwin et al.) describes a conduit liner monitor that allows for the non-destructive determination of the status of a liner disposed within a conduit. The conduit may, for example, be an elbow, valve, pipe. At least one wire is disposed within the liner in an area of concern. The wire is connected to a receptacle located on the conduit. A status display plugs into the receptacle and checks the continuity of the wire. If a wire is broken, this information is displayed, indicating a potential problem with the liner.

U.S. Pat. No. 6,386,237 (Chevalier et al.) describes an abrasive material transport hose with wear detecting sensors. The useful life of an abrasive material transport hose can be maximized if the hose is repositioned at the first signs of internal wear. This is accomplished by disposing at least two wear sensing elements, each at a specified distance from the inwardmost surface of the inner tube, and each monitoring a condition indicative of wear of the hose at its specified distance from the inwardmost surface of the inner tube. When the innermost wear sensing element implies wear, the hose can be repositioned to extend the useful life until the outermost wear sensing element indicates wear requiring replacement of the hose.

SUMMARY

In an aspect of this specification, an apparatus for transporting materials may comprise: an electrically conductive substrate; a protective liner including an electrically non-conductive first layer coupled to the substrate, and an electrically conductive second layer coupled to the first layer, wherein the first layer electrically insulates the second layer from the substrate; and a monitoring device connected to the substrate and the second layer, wherein the monitoring device is configured to detect an electrical connection between the substrate and the second layer indicative of wear of the protective liner.

The first and second layers may each be formed of an abrasion resistant and elastomeric material. The first layer may be bonded directly to the substrate, and the second layer may be bonded directly to the first layer.

The protective liner may comprise a third layer coupled to the second layer. The third layer may be formed of an abrasion resistant and elastomeric material. The third layer may be bonded directly to the second layer.

The monitoring device may be configured to transmit a signal if the electrical connection is detected. The monitoring device may comprise an RFID tag.

The apparatus may further comprise at least one of a temperature sensor or a flow sensor configured to monitor materials being transported by the substrate.

The substrate may comprise at least one of a pipe, a hose, an elbow, a valve or a tank. The substrate may comprise a pipe having an end, the protective liner being disposed outwardly at the end to form a seal with a protective liner of an adjacent pipe when connected in series.

The apparatus may further comprise a connection port, the connection port comprising: a casing portion mounted to the substrate; an insulating portion extending from the first layer through the casing portion; and a connection element extending from the second layer through the insulating portion, wherein the monitoring device is connected to and between the substrate and the connection element.

The second layer may comprise at least two electrically conductive sublayers. The apparatus may further comprise a skive joint joining adjacent portions of the protective liner.

In another aspect of this specification, an apparatus for transporting materials may comprise: a substrate; a protective liner including an electrically conductive first layer coupled to the substrate, an electrically non-conductive second layer coupled to the first layer and an electrically conductive third layer coupled to the second layer, wherein the second layer electrically insulates the third layer from the first layer; and a monitoring device connected to the first and third layers, wherein the monitoring device is configured to detect an electrical connection between the first and third layers indicative of wear of the protective liner.

The first, second and third layers may each be formed of an abrasion resistant and elastomeric material. The first layer may be bonded directly to the substrate, the second layer may be bonded directly to the first layer, and the third layer may be bonded directly to the second layer.

The protective liner may comprise a fourth layer coupled to the third layer. The fourth layer may be formed of an abrasion resistant and elastomeric material. The fourth layer may be bonded directly to the third layer.

The monitoring device may be configured to transmit a signal if the electrical connection is detected. The monitoring device may comprise an RFID tag.

The apparatus may further comprise at least one of a temperature sensor or a flow sensor configured to monitor materials being transported by the substrate.

The substrate may comprise at least one of a pipe, a hose, an elbow, a valve or a tank. The substrate may comprise a pipe having an end, the protective liner being disposed outwardly at the end to form a seal with a protective liner of an adjacent pipe when connected in series.

In another aspect of this specification, a system may comprise: a plurality of pipes connected in series and configured to transfer materials, each of the pipes including an electrically conductive substrate and a protective liner, the protective liner including an electrically non-conductive first layer bonded to the substrate, and an electrically conductive second layer bonded to the first layer, wherein the first layer electrically insulates the second layer from the substrate; a plurality of monitoring devices, each of the monitoring devices connected to the substrate and the second layer of at least one of the plurality of pipes, each of the monitoring devices configured to detect an electrical connection between the substrate and the second layer indicative of wear of the protective liner of the at least one of the plurality of pipes and transmit a signal in response to detecting the electrical connection; and a receiver device configured to receive the signals from the plurality of monitoring devices.

Each of the monitoring devices may comprise an RFID tag. The apparatus may further comprise at least one of a temperature sensor or a flow sensor configured to monitor materials being transported by the pipes.

In yet another aspect of this specification, a method may comprise: providing an electrically conductive substrate; applying a protective liner to the substrate, the protective liner including an electrically non-conductive first layer coupled to the substrate, and an electrically conductive second layer coupled to the first layer, wherein the first layer electrically insulates the second layer from the substrate; flowing materials over the second layer; and monitoring the protective liner to detect an electrical connection between the substrate and the second layer indicative of wear of the protective liner.

The protective liner may comprise a third layer coupled to the second layer. The method may further comprise, prior to the step of applying, preparing the protective liner by calendaring the first, second and third layers to form the protective liner. The method may further comprise, prior to the step of applying, carrying out a surface preparation technique to the substrate to improve bonding of the protective liner to the substrate. The method may further comprise, prior to the step of applying, using a solvent to prepare at least one of the first layer and the substrate to improve bonding of the protective liner to the substrate. The method may further comprise, in the step of applying, using an adhesive to bond the protective liner to the substrate.

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the present specification and are not intended to limit the scope of what is taught in any way. In the drawings:

FIG. 1 is a perspective, cutaway view of a material transport apparatus with a protective liner;

FIG. 2 is a schematic, sectional view of the material transport apparatus of FIG. 1;

FIG. 3 is a sectional view of a pipe with the protective liner of FIG. 1;

FIG. 4 is a detailed view of the pipe of FIG. 3;

FIG. 5 is a perspective view of a pipe with a connection port;

FIG. 6 is a schematic sectional view of the connection port of FIG. 5;

FIG. 9 is a perspective, cutaway view of another material transport apparatus with a protective liner; and FIG. 10 is a schematic, sectional view of the material transport apparatus of FIG. 9.

DETAILED DESCRIPTION

Figures 7, 8:
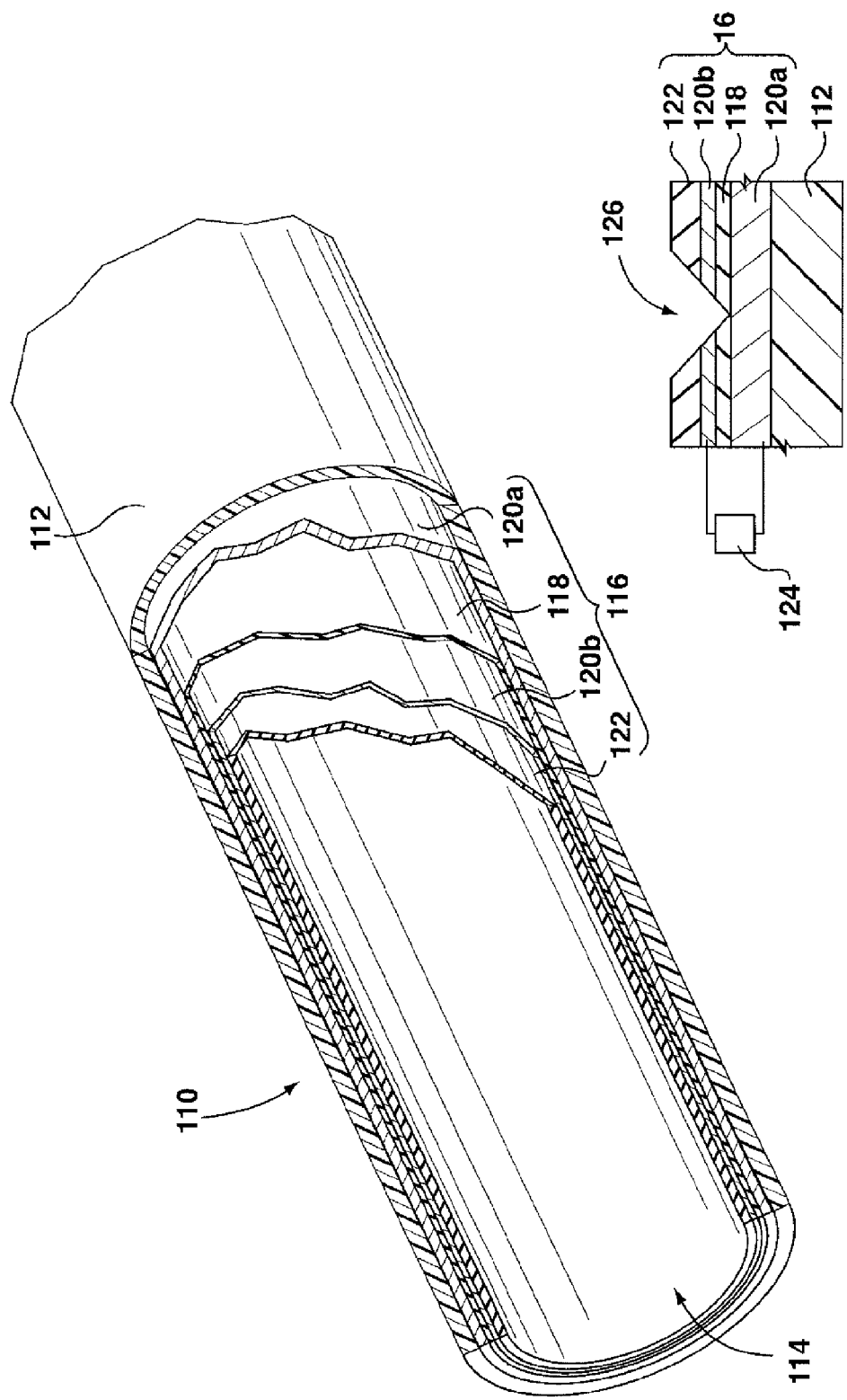
FIG. 7 is a perspective, cutaway view of another material transport apparatus with a protective liner.
FIG. 8 is a schematic, sectional view of the material transport apparatus of FIG. 7.

Generally, the concepts described herein relate to a material transport apparatus having a protective liner. The protective liner includes a plurality of layers, at least some of which may be formed of abrasion resistant materials. The layers include conductive and non-conductive layers. A monitoring device is coupled to at least one conductive layer and is configured to detect an electrical connection indicative of wear of the protective liner. The protective liner may be used to line apparatuses for transporting abrasive materials in various applications, for example, mine slurry piping, power generation piping, desalination piping, etc.

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors or owners reserve all rights that they may have in any invention disclosed in an apparatus or process described below that is not claimed in this document, for example the right to claim such an invention in a continuing application and do not intend to abandon, disclaim or dedicate to the public any such invention by its disclosure in this document.

It may be appreciated that for simplicity and clarity of illustration, where considered appropriate, reference numerals may be repeated among the drawings to indicate corresponding or analogous elements.

Referring to FIG. 1, an example of a material transport apparatus is shown generally at 10. The apparatus 10 includes a substrate 12 defining an interior space 14 for transporting materials therein.

The substrate 12 is electrically conductive. A component is electrically conductive if it is formed generally of a material which contains movable electric charges. In some examples, the substrate 12 may be formed partially or entirely of metallic materials. In some examples, the substrate 12 may be formed of steel.

The apparatus 10 includes a protective liner 16 lining the substrate 12 in the interior space 14 thereof.

Referring to FIGS. 1 and 2, the protective liner 16 includes an electrically non-conductive first layer 18. A component is electrically non-conductive if it is formed generally of an insulating material that resists the flow of electric current. The first layer 18 is coupled to the substrate 12. The term coupled refers to the first layer 18 being connected directly to the substrate 12, or connected indirectly to the substrate 12 by one or more intermediate layers. In some examples, the first layer 18 may be bonded directly to the substrate 12.

The protective liner 16 includes an electrically conductive second layer 20 coupled to the first layer 18. In some examples, the second layer 20 may be bonded directly to the first layer 18.

The first layer 18 electrically insulates the second layer 20 from the substrate 12. A monitoring device 24 (FIG. 2) is connected to and between the substrate 12 and the second layer 20. If a region of wear 26 develops, a break in the first layer 18 allows for an electrical connection to be made between the second layer 20 and the substrate 12, via materials in the interior space 14. Thus, the monitoring device 24 may detect an electrical connection between the substrate 12 and the second layer 20 which is indicative of wear of the protective liner 16.

It may be appreciated that eddy currents present in the flow of materials may cause localized wear, resulting in uneven and unpredictable failure of different sections of a given material transport apparatus. An electrical conduit placed in a coiled fashion within the interior of the pipe, for example, may only be able to detect wear if the region of wear coincides with a particular location of the electrical conduit within the pipe. In contrast, the second layer 20 may provide generally total coverage of the interior space 14 of the substrate 12.

The protective liner 16 may optionally include a third layer 22 coupled to the second layer 20. In some examples, the third layer 22 may be bonded directly to the second layer 20.

In the example illustrated, the substrate 12 is generally cylindrical in shape, with the protective liner 16 disposed internally of the substrate 12. The first, second and third layers 18, 20, 22 are disposed progressively internally of the substrate 12 in the interior space 14. The apparatus 10 may be used as a pipe or a hose to convey materials through the interior space 14 of the substrate 12, internally of the protective liner 16. In some examples, the substrate 12 may further include a valve, an elbow, or a tank.

In some examples, the apparatus 10 may be used for the transport of abrasive materials, for example, the transport of slurries in the mining industry. At least one of the layers 18, 20, 22 may be formed of an abrasion resistant material. Abrasion resistance refers to the ability of a material to withstand mechanical action such as rubbing, scraping, or erosion, which tends progressively to remove material from its surface.

In some examples, the first and third layers 18, 22 may be formed of an electrically non-conductive polymer, e.g., a rubber, a polyurethane material, or ABS. In some examples, the second layer 20 may be formed of an electrically conductive polymer, e.g., an elastomer or epoxy material blended with carbon or a metallic material, or polyaniline materials.

In a particular example, the first layer 18 may be formed of ⅛" pure gum rubber (product number 6425 obtained from Polycorp Ltd. of Elora, Ontario, Canada), the second layer 20 may be formed of ⅛" synthetic/natural blend rubber (product number RS-0563 from RubberSource Inc. of Cambridge, Ontario, Canada), and the third layer 22 may be formed of ¼" pure gum rubber (product number 6425 obtained from Polycorp Ltd. of Elora, Ontario, Canada).

Prior to installing the protective liner 16 to the substrate 12, the protective liner 16 may first be prepared by calendaring the layers 18, 20, 22 to form the protective liner 16. It may be desirable to apply one or more surface preparation techniques (e.g., sandblasting) to the substrate 12 before applying the first layer 18 to improve bonding of the protective liner 16 to the substrate 12. A solvent (e.g., toluene) may also be used to prepare the first layer 18 and substrate 12 before applying the first layer 18 to improve bonding of the protective liner 16 to the substrate 12. An adhesive (e.g., Chemlok™) may be used to bond the first layer 18 to the substrate 12 to install the protective liner 16 to the substrate 12. Finally, the protective liner 16 may be cured after installation to the substrate 12 to change the protective liner 16 from a natural state to a vulcanized state.

In another particular example, the first layer 18 may be formed of ¹⁄₁₆" tie gum natural rubber and the second layer 20 may be formed of ³⁄₁₆" 60 duro electrically conductive natural rubber, with these two layers joined together by calendaring to form the protective liner (product number BRS-60EC obtained from RubberSource Inc. of Cambridge, Ontario, Canada), and without the third layer 22. In this example, the ³⁄₁₆" conductive layer possesses relatively high Carbon content and thus good abrasion resistance. Furthermore, the joined first and second layers 18, 20 can be bonded directly to the substrate, and without a third layer, offering ease of installation.

In yet another particular example, the first and third layers 18, 22 may be an electrically non-conductive polyurethane coating (e.g., 2 to 8 DFT of Interthane™ 990) applied directly to the substrate 12 and the second layer 20, respectively. The second layer 20 may be an electrically conductive epoxy coating (e.g., 2 to 8 DFT of Interzinc™ 315) applied directly to the first layer 18. In such an example, no adhesive or other bonding agent may be necessary to bond the first, second and third layers 18, 20, 22 to the substrate 12. However, it may be desirable to apply one or more surface preparation techniques (e.g., sandblasting) to the substrate 12 before applying the first layer 18 to improve bonding of the protective liner 16 to the substrate 12. A solvent (e.g., toluene) may also be used to prepare the substrate 12 before applying the first layer 18 to improve bonding of the protective liner 16 to the substrate 12.

The monitoring device 24 may be any suitable electrical device capable of detecting an electrical connection between the substrate 12 and the second layer 20, thus detecting a break in the first layer 18 indicative of wear of the protective liner 16.

In some examples, the monitoring device 24 may include an analog circuit with wires connected to the substrate 12 and to the second layer 20. The analog circuit may include a battery and an output device, for example, a light or an audible alarm, which turns on in response to an electrical connection being detected between the second layer 20 and the substrate 12.

In some examples, the monitoring device 24 may include a PLC configured to send a signal to a computer, an audible alarm, a light display, etc., in response to an electrical connection being detected between the second layer 20 and the substrate 12.

In some examples, the monitoring device 24 may include a radio-frequency identification (RFID) tag. In such examples, the monitoring device 24 may be configured to relay a signal to a receiver, either generally continuously, periodically, and/or only in response to an electrical connection being detected between the substrate 12 and the second layer 20. The RFID tag may also be connected to one or more other sensors used to monitor the materials within the apparatus 10, e.g., temperature sensors or flow sensors.

In a particular example, the monitoring device 24 may include a ZT-50™ active RFID tag (TagSense Inc. of Cambridge, Mass., U.S.A.). The ZT-50™ is an active tag that communicates via IEEE 802.15.4 protocol. The operating frequency of 2.45 GHz may enable the ZT-50 to maintain a relatively small size and long read range (50-70 meters in free space).

A plurality of apparatuses 10 may be connected in series to form a system, and each monitored using at least one RFID tag connected to the substrate 12 and the second layer 20 of at least one of the pipes. The RFID tags may be configured to transmit a signal in response to an electrical connection being detected between the respective substrate 12 and the second layer 20. A central receiver, e.g., located in a control room, may be configured to receive the signal from the RFID tags indicative of wear of the protective liner 16.

As described above, an electrical connection may be made when there is a break in the first layer 18. Thus, it may be appreciated that the wear detection of the protective liner 16 provided by the monitoring device 24 is predictive because it may provide an indication of wear generally prior to failure of the substrate 12. Predictive wear detection may avoid post failure repair and replacement. Furthermore, predictive wear detection may avoid possible environmental hazard and safety concerns if, for example, materials are being transported under pressure, and/or the materials are hazardous. Moreover, predictive wear detection may avoid having to decommission piping for purposes of wear inspection, and may allow for scheduled maintenance and "just-in-time" supply of replacement materials for the protective liner 16.

Referring to FIGS. 3 and 4, the substrate 12 may take the form of a pipe, e.g., with an 8", 12" or 24" outer diameter, formed of Electric Resistance Welded (ERW) Pipe Grade B carbon steel. In the example illustrated, the substrate 12 is cylindrical and includes a flange end 30 and a stub end 32. The protective liner 16 lines the interior space 14 of the apparatus 10 between the flange end 30 and the stub end 32. At the flange end 30, the substrate 12 and an annular flange portion 34 may be fillet welded together. At both the flange and stub ends 30, 32 the protective liner 16 may be disposed outwardly in order to form a seal with a protective liner of an adjacent pipe (not shown) when connected in series.

Referring to FIGS. 5 and 6, the apparatus 10 is shown further including a connection port 36. In the example illustrated, the connection port 36 includes a cylindrical casing portion 38 that is mounted (e.g., threaded) to the substrate 12. The connection port 36 includes an insulating portion 40 that is formed of electrically non-conductive material that extends from the first layer 18 through the casing portion 38. The connection port 36 further includes a connection element 42 that is formed of electrically conductive material (e.g., copper wire) that extends from the second layer 20 through the insulating portion 40. The insulating portion 40 electrically insulates the connection element 42 from the substrate 12 and the casing portion 38. The monitoring device 24 may be connected to and between the substrate 12 and the connection element 42 of the connection port 36.

Referring to FIGS. 7 and 8, another example of a material transport apparatus is shown generally at 110. The apparatus 110 includes a substrate 112 defining an interior space 114 for transporting materials therein.

The substrate 112 may be electrically non-conductive. In some examples, the substrate 112 may be formed partially or entirely of polymeric materials. In some examples, the substrate 112 may be formed of PVC.

The apparatus 110 includes a protective liner 116 lining the substrate 112 in the interior space 114 thereof.

The protective liner 116 includes an electrically conductive first layer 120a. The first layer 120a is coupled to the substrate 112. In some examples, the first layer 120a may be bonded directly to the substrate 112.

The protective liner 116 includes an electrically non-conductive second layer 118 coupled to the first layer 120a. In some examples, the second layer 118 may be bonded directly to the first layer 120a.

The protective liner 116 further includes an electrically conductive third layer 120b coupled to the second layer 118. In some examples, the third layer 120b may be bonded directly to the second layer 118.

The second layer 118 electrically insulates the third layer 120b from the first layer 120a. A monitoring device 124 (FIG. 8) is connected to and between the third layer 120b and the first layer 120a. If a region of wear 126 develops, a break in the second layer 118 allows for an electrical connection to be made between the third layer 120b and the first layer 120a, via materials in the interior space 114. Thus, the monitoring device 124 may detect an electrical connection between the third layer 120b and the first layer 120a which is indicative of wear of the protective liner 116.

The protective liner 116 may optionally include a fourth layer 122 coupled to the third layer 120b. In some examples, the fourth layer 122 may be bonded directly to the third layer 120b. At least one of the layers 120a, 118, 120b, 122 may be formed of an abrasion resistant material.

In the example illustrated, the substrate 112 is generally cylindrical in shape, with the protective liner 116 disposed internally of the substrate 112. The first, second, third and fourth layers 120a, 118, 120b, 122 are disposed progressively internally of the substrate 112 in the interior space 114. The apparatus 110 may be used as a pipe or a hose to convey materials through the interior space 114, internally of the protective liner 116. In some examples, the substrate 112 may further include a valve, an elbow, or a tank.

Referring to FIGS. 9 and 10, another example of a material transport apparatus is shown generally at 210. The apparatus 210 includes a substrate 212 defining an interior space 214 for transporting materials therein. The substrate 212 may include at least one inlet/outlet port 244 for providing access to the interior space 214.

The substrate 212 is electrically conductive. In some examples, the substrate 212 may be formed partially or entirely of metallic materials.

The apparatus 210 includes a protective liner 216 lining the substrate 212 in the interior space 214 thereof.

The protective liner 216 includes an electrically non-conductive first layer 218. The first layer 218 is coupled to the substrate 212. In some examples, the first layer 218 may be bonded directly to the substrate 212.

The protective liner 216 includes two electrically conductive sublayers 220a, 220b, which are coupled to the first layer 218. In some examples, the sublayers 220a, 220b may be bonded directly to the first layer 218.

The first layer 218 electrically insulates the sublayers 220a, 220b from the substrate 212. A monitoring device 224 (FIG. 10) is connected to and between the sublayers 220a, 220b (either connected to the sublayer 220a, sublayer 220b, or both) and the substrate 212. If a region of wear develops (not shown), a break in the first layer 218 allows for an electrical connection to be made between the sublayers 220a, 220b and the substrate 212, via materials in the interior space 214. Thus, the monitoring device 224 may detect an electrical connection between the sublayers 220a, 220b and the substrate 212 which is indicative of wear of the protective liner 216.

The protective liner 216 may optionally include a third layer 222 coupled to the sublayer 220b. In some examples, the third layer 222 may be bonded directly to the sublayer 220b. At least one of the layers 218, 220a, 220b, 222 may be formed of an abrasion resistant material.

In the example illustrated, the substrate 212 is generally cuboidal in shape, with the protective liner 216 disposed internally of the substrate 212. The first layer 218, the sublayers 220a, 220b and the third layer 222 are disposed progressively internally of the substrate 212 in the interior space 214. The apparatus 210 may be used as a tank to store and/or convey materials through the interior space 214, internally of the protective liner 216.

Referring to FIG. 10, a skive joint 246 may be used to join adjacent portions of the protective liner 216 within the apparatus 210. The skive joint 246 includes a first step portion 248, a bridging portion 250 and a second step portion 252. Surface area between the sublayers 220a, 220b provided by the bridging portion 250 may ensure that an adequate electrical connection is made between the sublayers 220a, 220b.

While the above description provides examples of one or more processes or apparatuses, it will be appreciated that other processes or apparatuses may be within the scope of the accompanying claims.

I claim:

1. A method, comprising:
   providing an electrically conductive substrate;
   applying a protective liner to the substrate, the protective liner including an electrically non-conductive first layer coupled to the substrate, and an electrically conductive second layer coupled to the first layer, wherein the first layer electrically insulates the second layer from the substrate, and wherein the first and second layers each is formed of an abrasion resistant, rubber material;
   flowing materials over the second layer; and
   monitoring the protective liner to detect an electrical connection between the substrate and the second layer indicative of wear of the protective liner,
   wherein the protective liner comprises a third layer coupled to the second layer, and the third layer is formed of an abrasion resistant, rubber material, and
   further comprising, prior to the step of applying, preparing the protective liner by calendaring the first, second and third layers to form the protective liner.

2. The method of claim 1, further comprising, prior to the step of applying, carrying out a surface preparation technique to the substrate to improve bonding of the protective liner to the substrate.

3. The method of claim 1, further comprising, prior to the step of applying, using a solvent to prepare at least one of the first layer and the substrate to improve bonding of the protective liner to the substrate.

4. The method of claim 1, further comprising, in the step of applying, using an adhesive to bond the protective liner to the substrate.

5. The method of claim 1, further comprising, in the step of applying, curing the protective liner to change the protective liner from a natural state to a vulcanized state.

6. The method of claim 1, further comprising monitoring at least one of temperature and flow rate of the materials.

7. A method, comprising:
   providing an electrically conductive substrate;
   applying a protective liner to the substrate, the protective liner including an electrically non-conductive first layer coupled to the substrate, and an electrically conductive second layer coupled to the first layer, wherein the first layer electrically insulates the second layer from the substrate, and wherein the first and second layers each is formed of an abrasion resistant, rubber material;
   flowing materials over the second layer;
   monitoring the protective liner to detect an electrical connection between the substrate and the second layer indicative of wear of the protective liner; and
   in the step of applying, curing the protective liner to change the protective liner from a natural state to a vulcanized state.

8. The method of claim 7, wherein the protective liner comprises a third layer coupled to the second layer, and the third layer is formed of an abrasion resistant, rubber material.

9. The method of claim 8, further comprising, prior to the step of applying, preparing the protective liner by calendaring the first, second and third layers to form the protective liner.

10. The method of claim 7, further comprising, prior to the step of applying, carrying out a surface preparation technique to the substrate to improve bonding of the protective liner to the substrate.

11. The method of claim 7, further comprising, prior to the step of applying, using a solvent to prepare at least one of the first layer and the substrate to improve bonding of the protective liner to the substrate.

12. The method of claim 7, further comprising, in the step of applying, using an adhesive to bond the protective liner to the substrate.

13. The method of claim 7, further comprising monitoring at least one of temperature and flow rate of the materials.

* * * * *